C. W. VAN VLEET.
MATCH BOXING MACHINE.
APPLICATION FILED DEC. 7, 1915.

1,345,420.

Patented July 6, 1920.
13 SHEETS—SHEET 1.

INVENTOR
Charles W. Van Vleet
BY
ATTORNEYS

C. W. VAN VLEET.
MATCH BOXING MACHINE.
APPLICATION FILED DEC. 7, 1915.

1,345,420.

Patented July 6, 1920.
13 SHEETS—SHEET 2.

INVENTOR
Charles W. Van Vleet,
BY
Kenyon & Kenyon
his ATTORNEYS

C. W. VAN VLEET.
MATCH BOXING MACHINE.
APPLICATION FILED DEC. 7, 1915.
1,345,420.
Patented July 6, 1920.
13 SHEETS—SHEET 3.
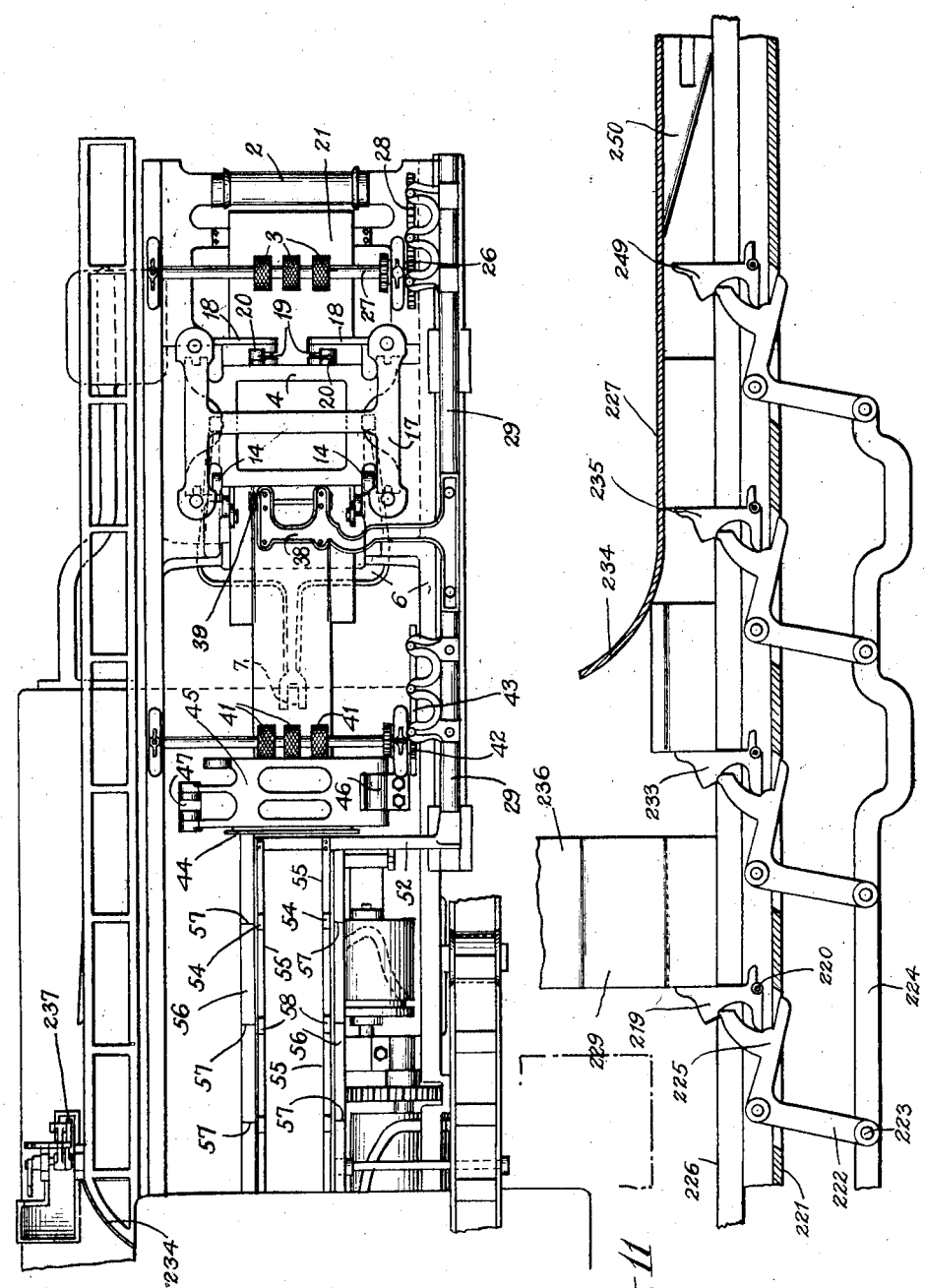

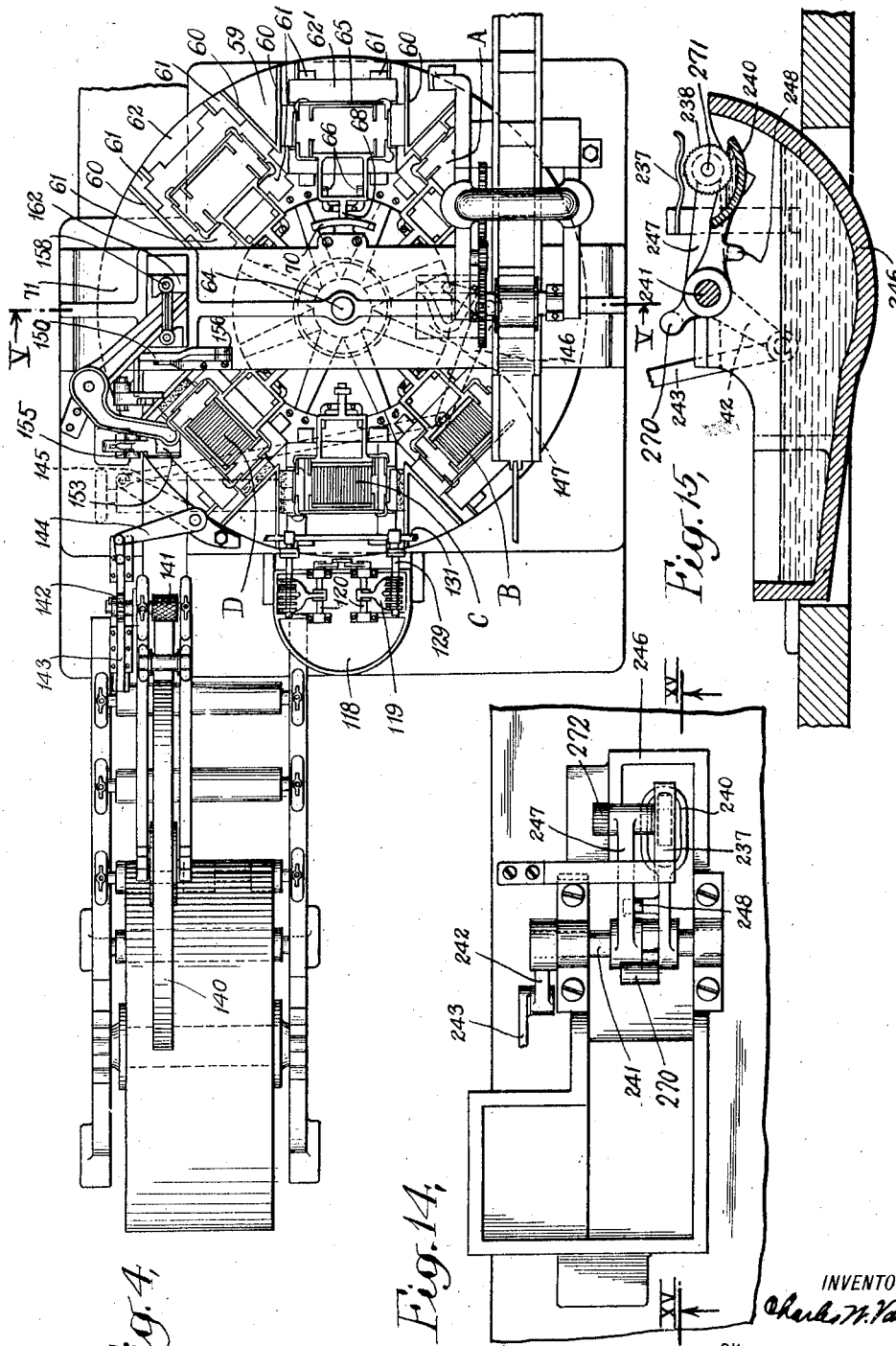

C. W. VAN VLEET.
MATCH BOXING MACHINE.
APPLICATION FILED DEC. 7, 1915.
1,345,420.
Patented July 6, 1920.
13 SHEETS—SHEET 5.
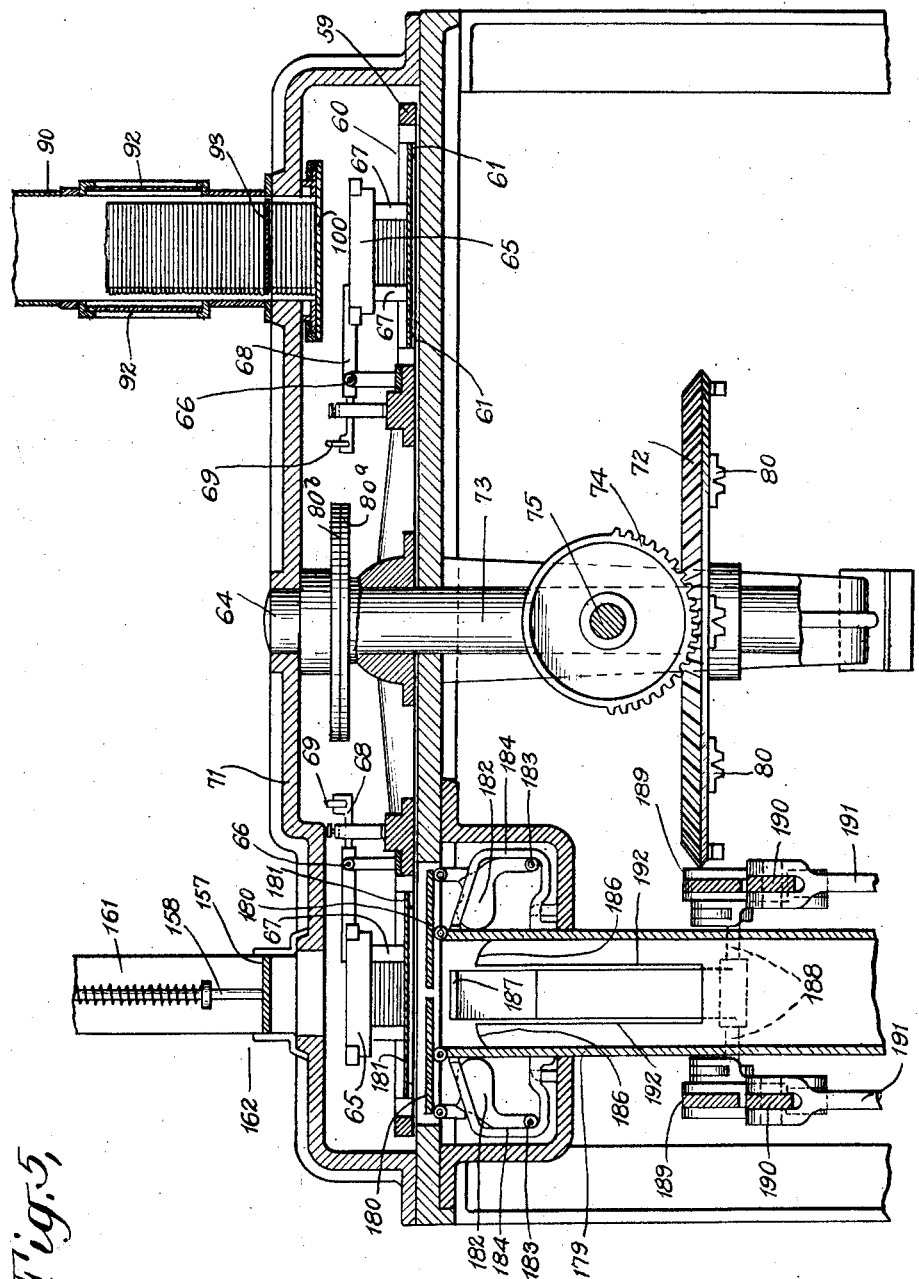

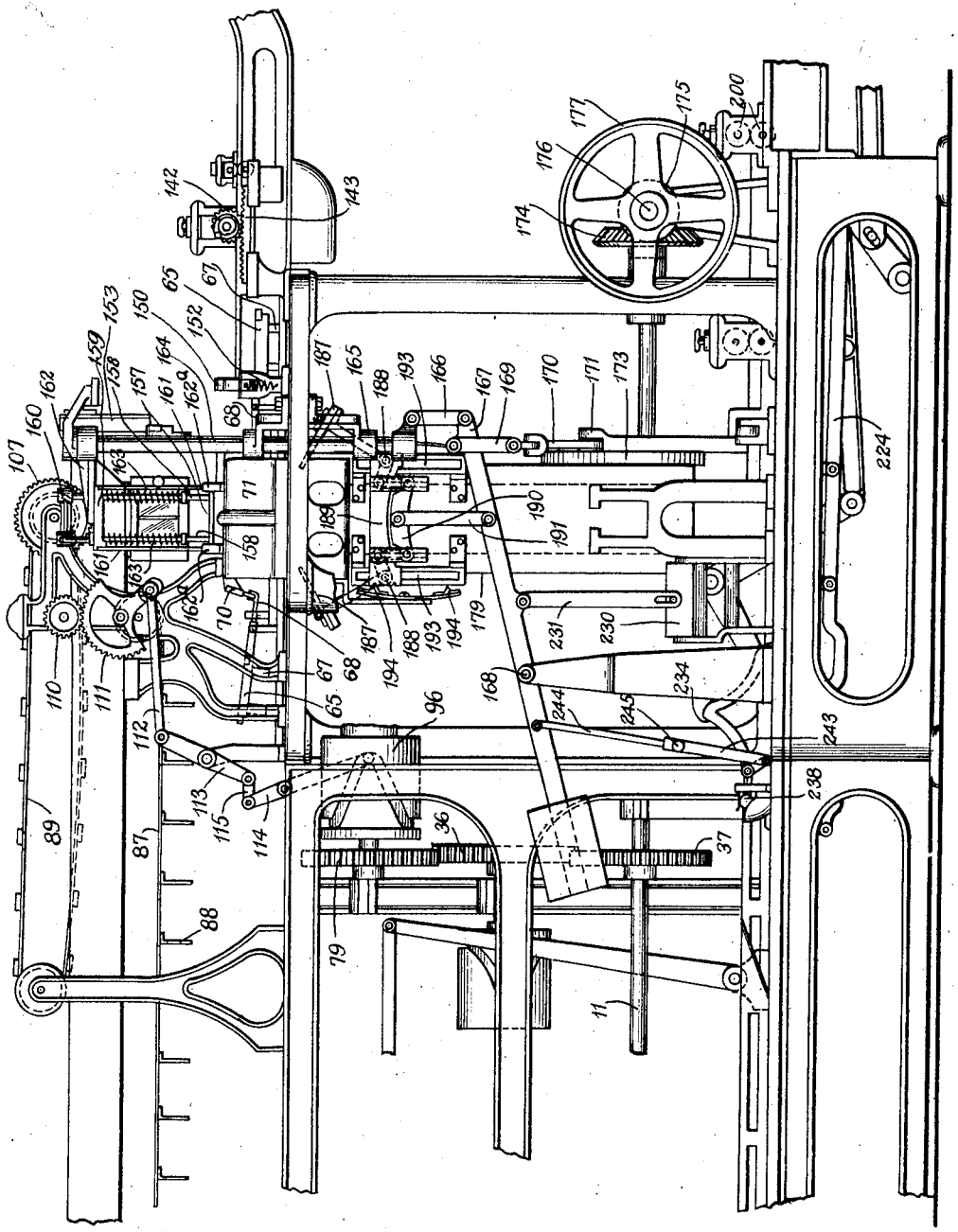

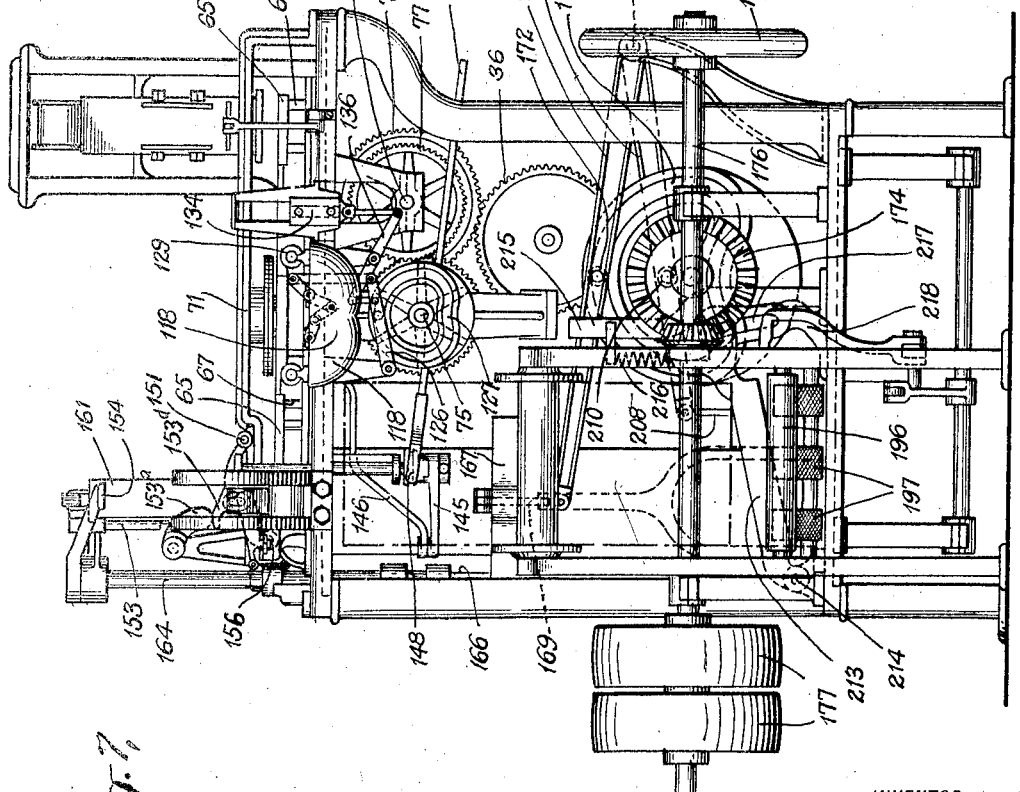
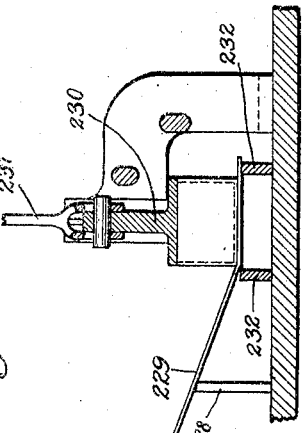
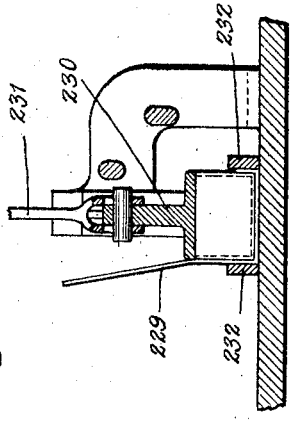

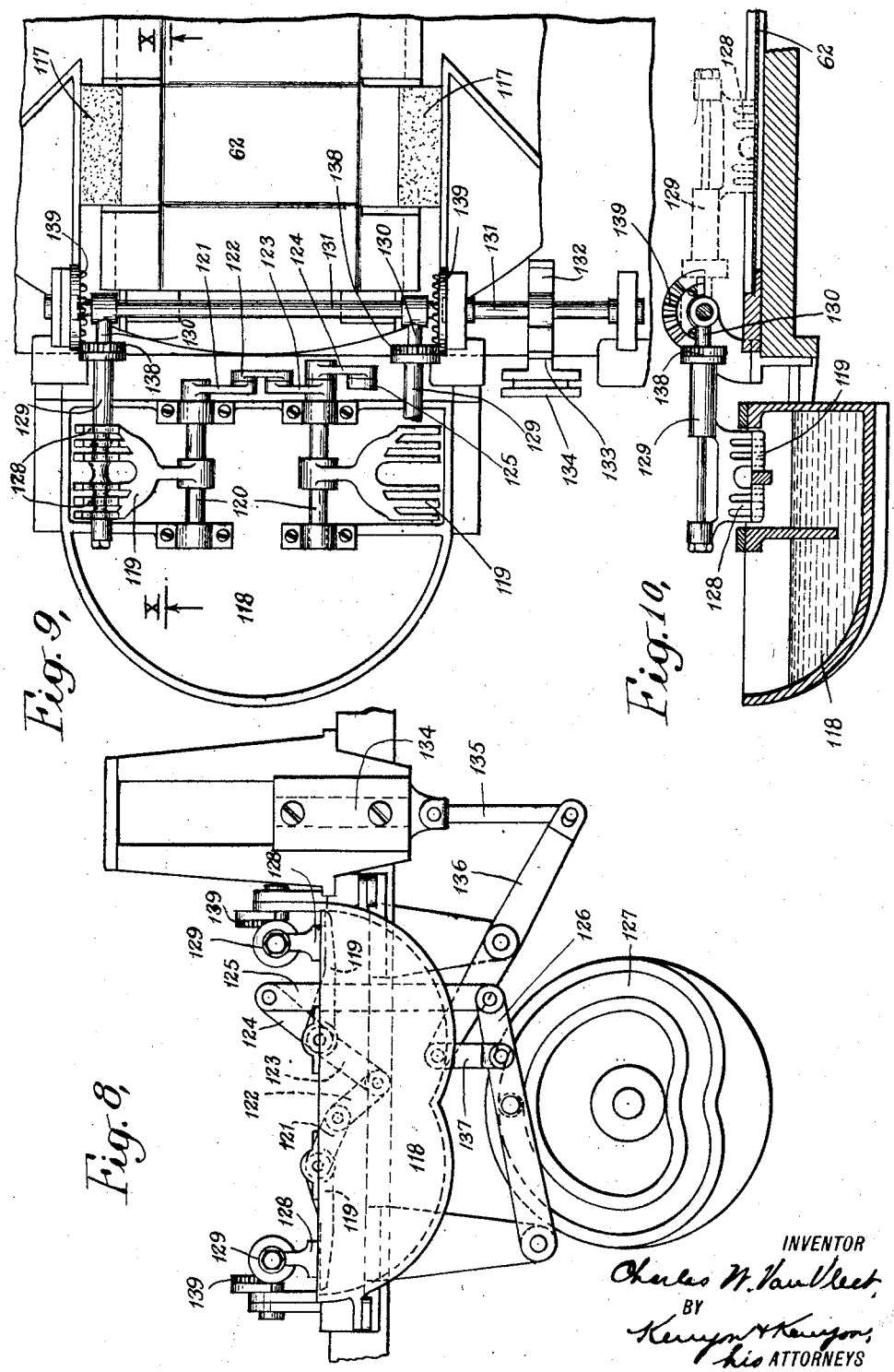

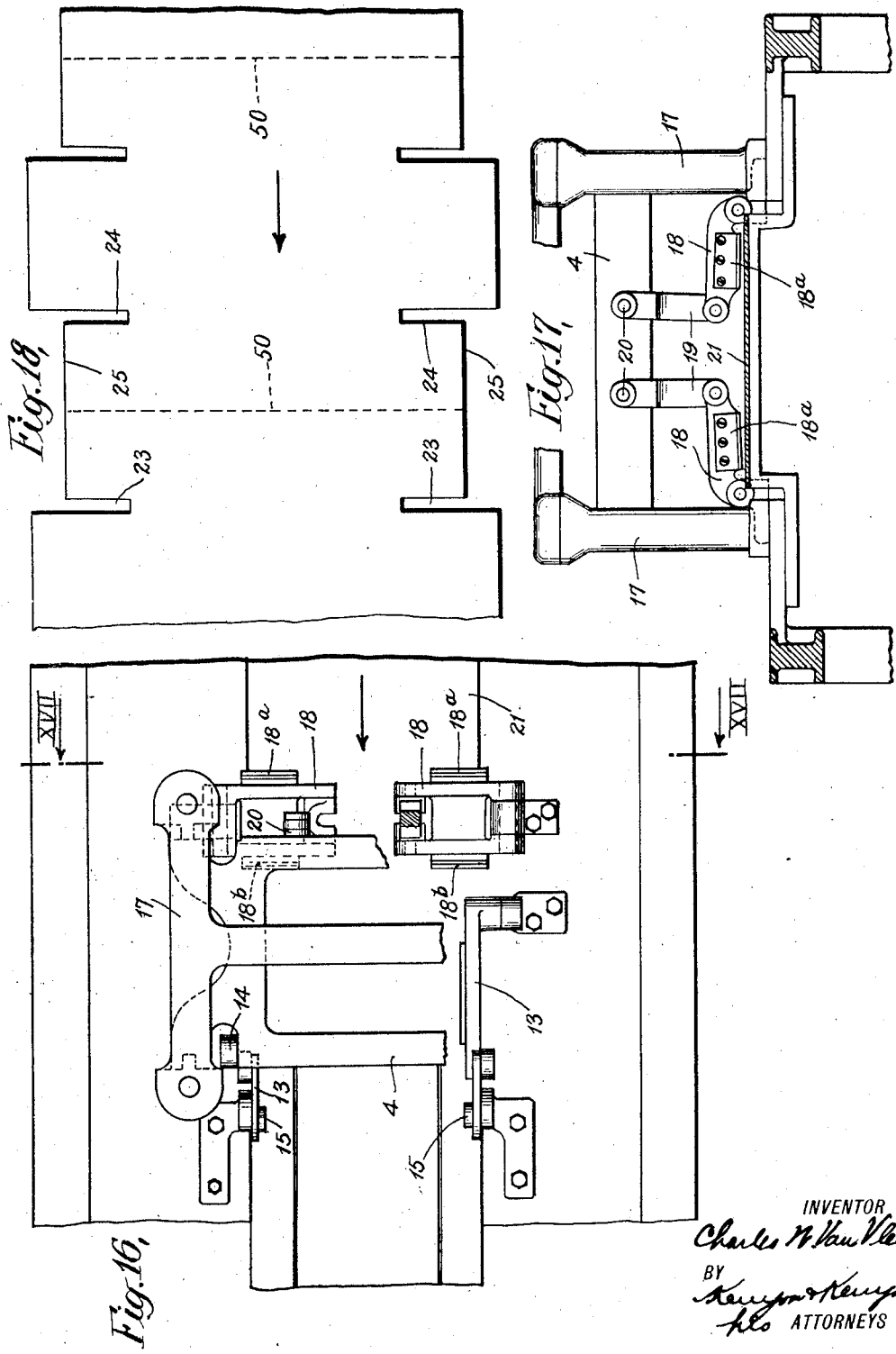

C. W. VAN VLEET.
MATCH BOXING MACHINE.
APPLICATION FILED DEC. 7, 1915.
1,345,420.
Patented July 6, 1920.
13 SHEETS—SHEET 10.
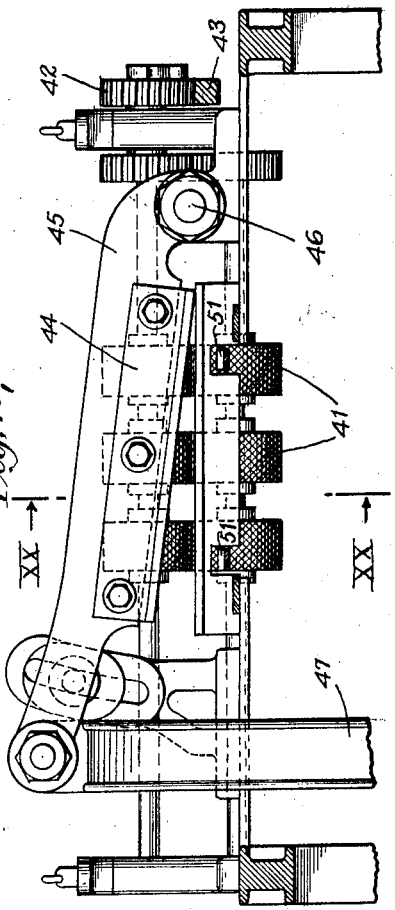
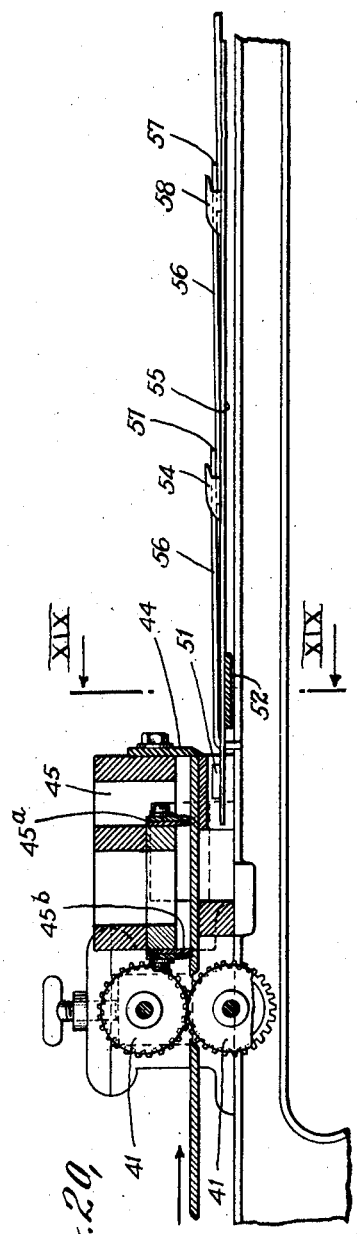
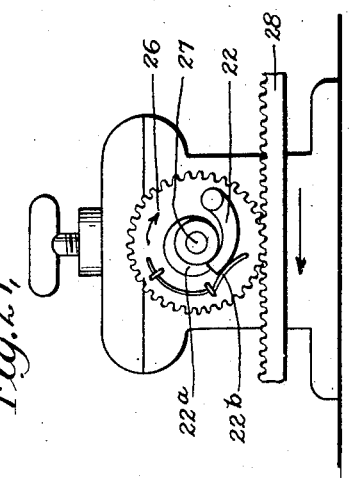
INVENTOR
Charles W. Van Vleet,
BY
Kenyon & Kenyon
his ATTORNEYS

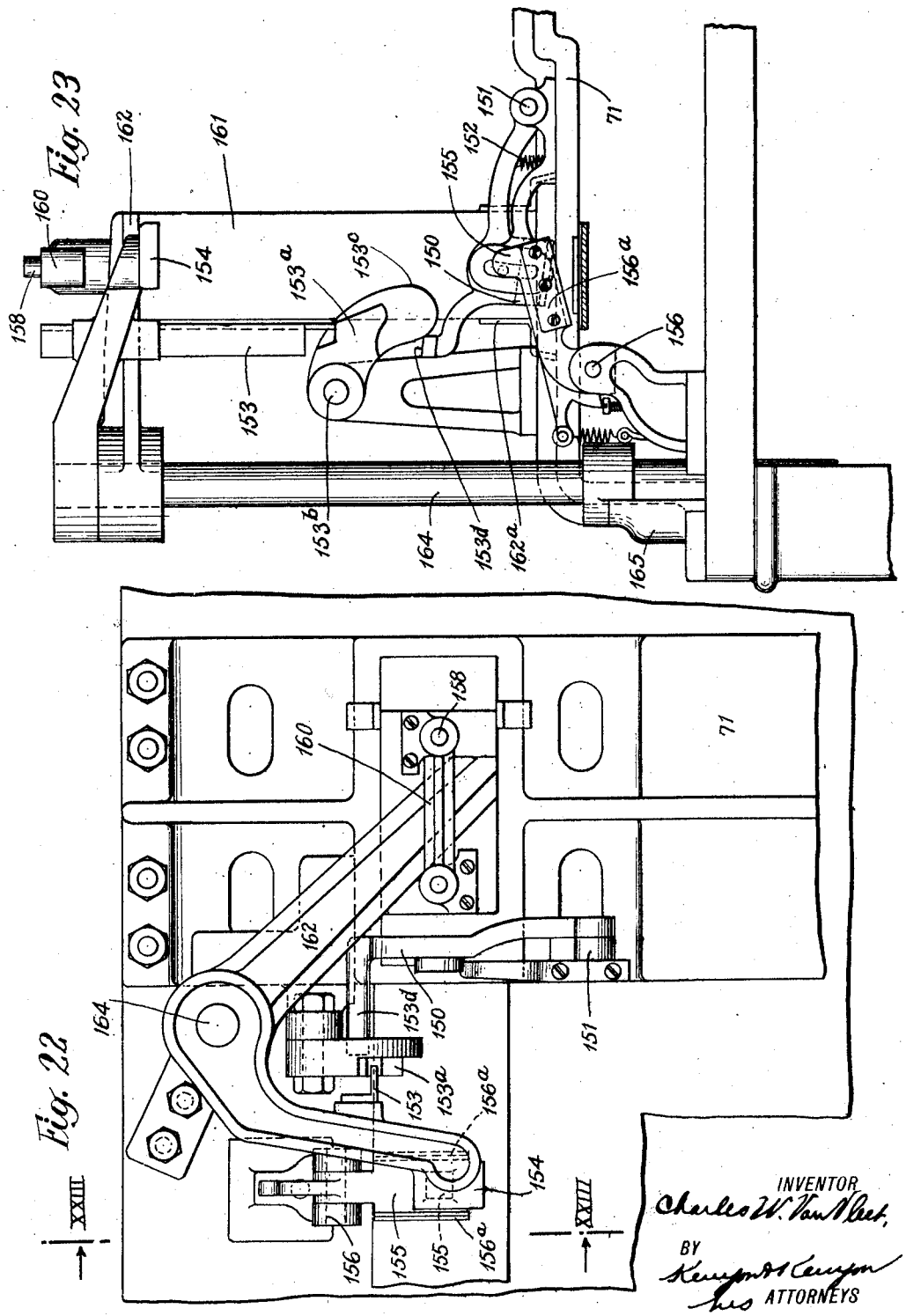

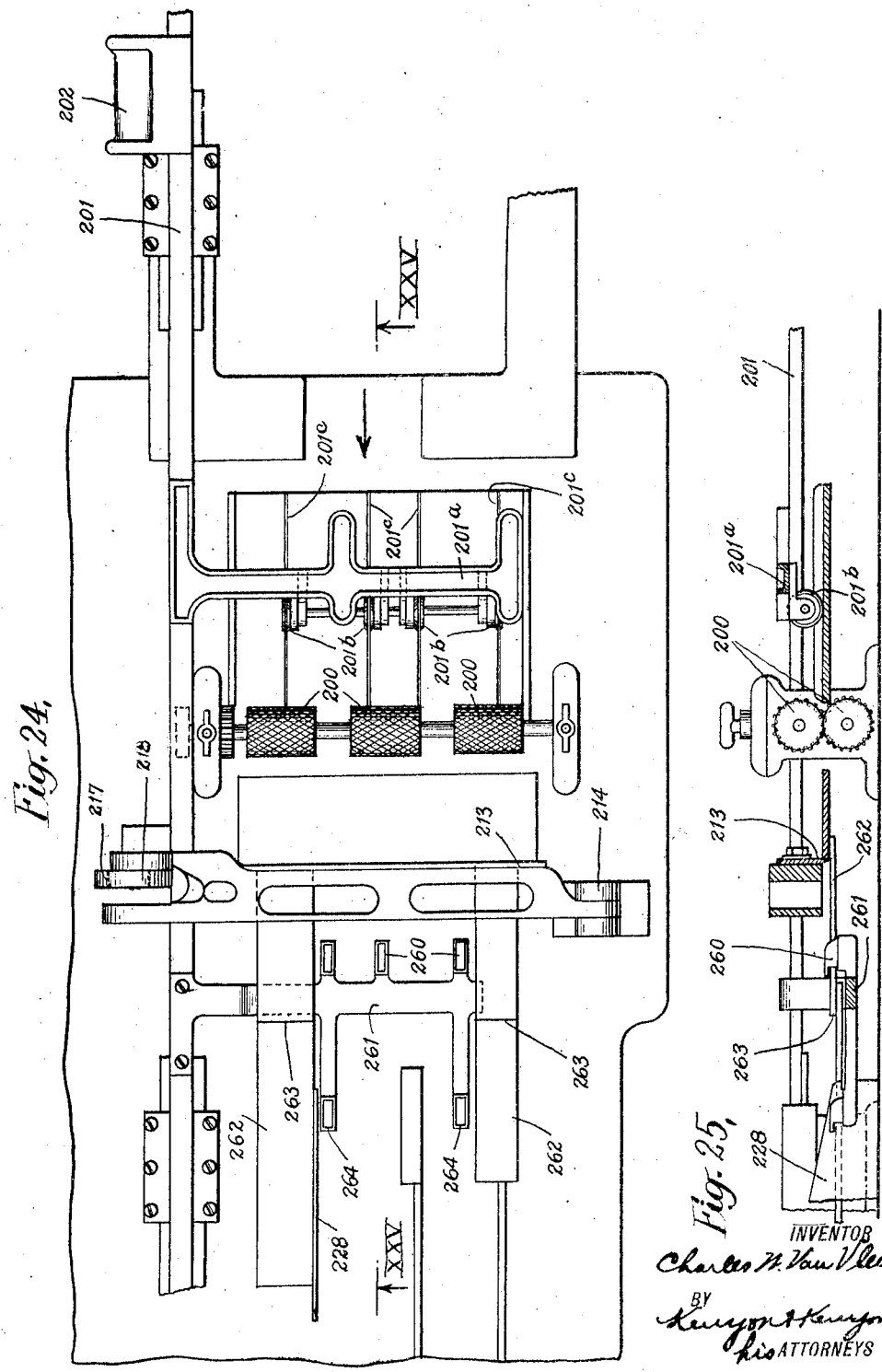

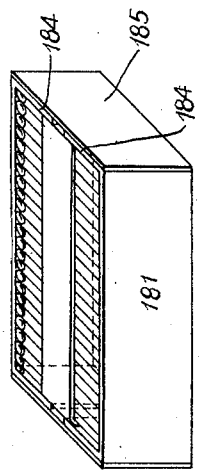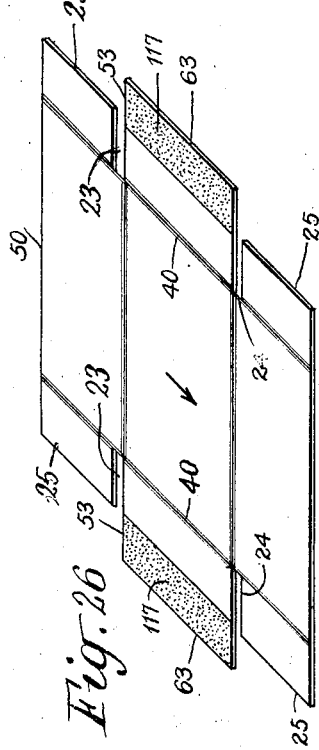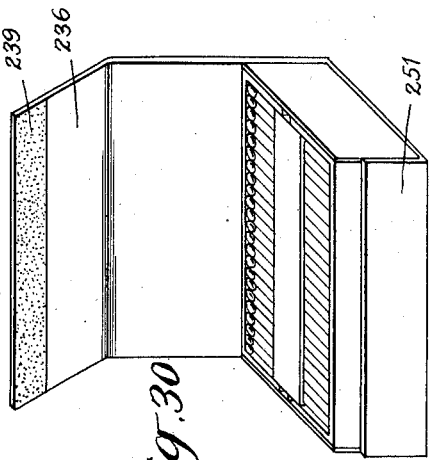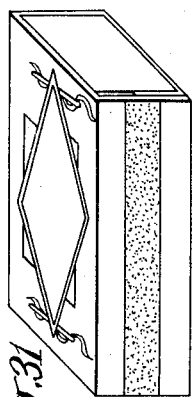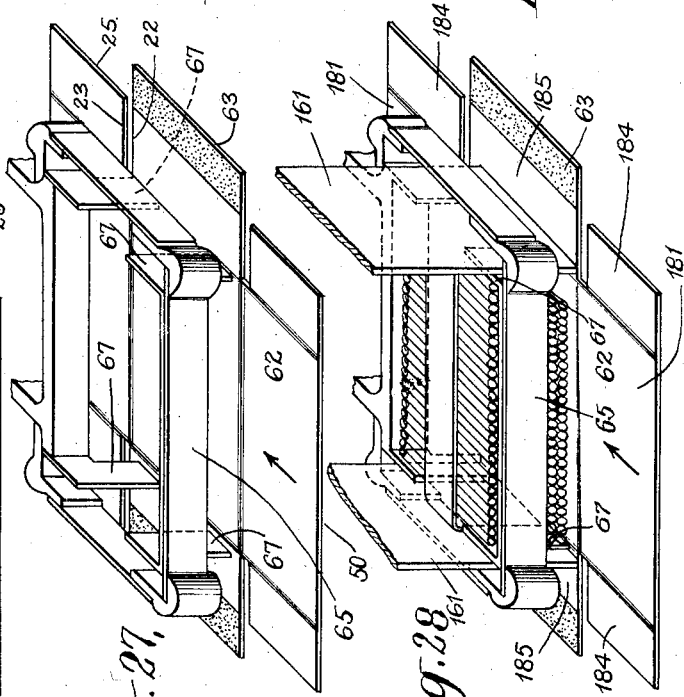

UNITED STATES PATENT OFFICE.

CHARLES W. VAN VLEET, OF SAUGERTIES, NEW YORK, ASSIGNOR OF THREE-EIGHTHS TO JAMES T. MAXWELL, OF SAUGERTIES, NEW YORK, AND ONE-EIGHTH TO HENRY S. HOWLAND, OF MONTCLAIR, NEW JERSEY.

MATCH-BOXING MACHINE.

1,345,420.      Specification of Letters Patent.      Patented July 6, 1920.

Application filed December 7, 1915. Serial No. 65,452.

*To all whom it may concern:*

Be it known that I, CHARLES W. VAN VLEET, a citizen of the United States, and resident of Saugerties, Ulster county, New York, have invented certain new and useful Improvements in Match-Boxing Machines, of which the following is a specification.

The invention relates to machines for boxing matches or the like and the object of the invention is to improve such machines that various of the operations may be carried out automatically in a more satisfactory manner than has heretofore been accomplished, and without material danger of igniting the matches. With this end in view, the invention comprehends a machine having improved means for feeding box blanks and applying the necessary adhesive thereto, improved means for feeding matches to the box blanks; improved means for forming the box blanks about the matches, means for feeding a protective strip to the box of matches, and improved means for applying a removable cover to the box of matches and applying the necessary adhesive to the cover.

More specific objects, features and advantages will more clearly appear from the detailed description given below, taken in connection with the accompanying drawings, which form a part of this specification.

Figure 1:
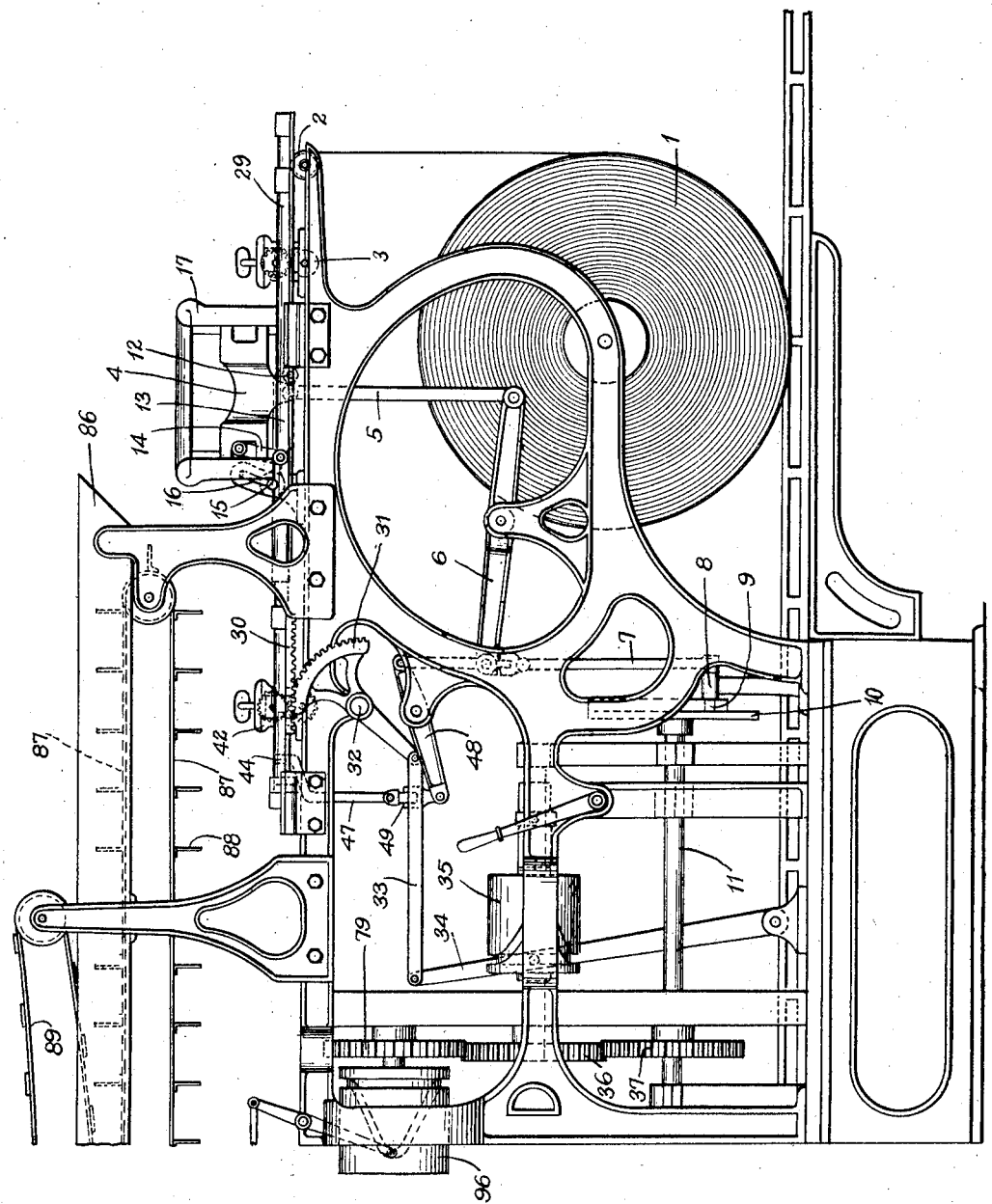
Figure 2:
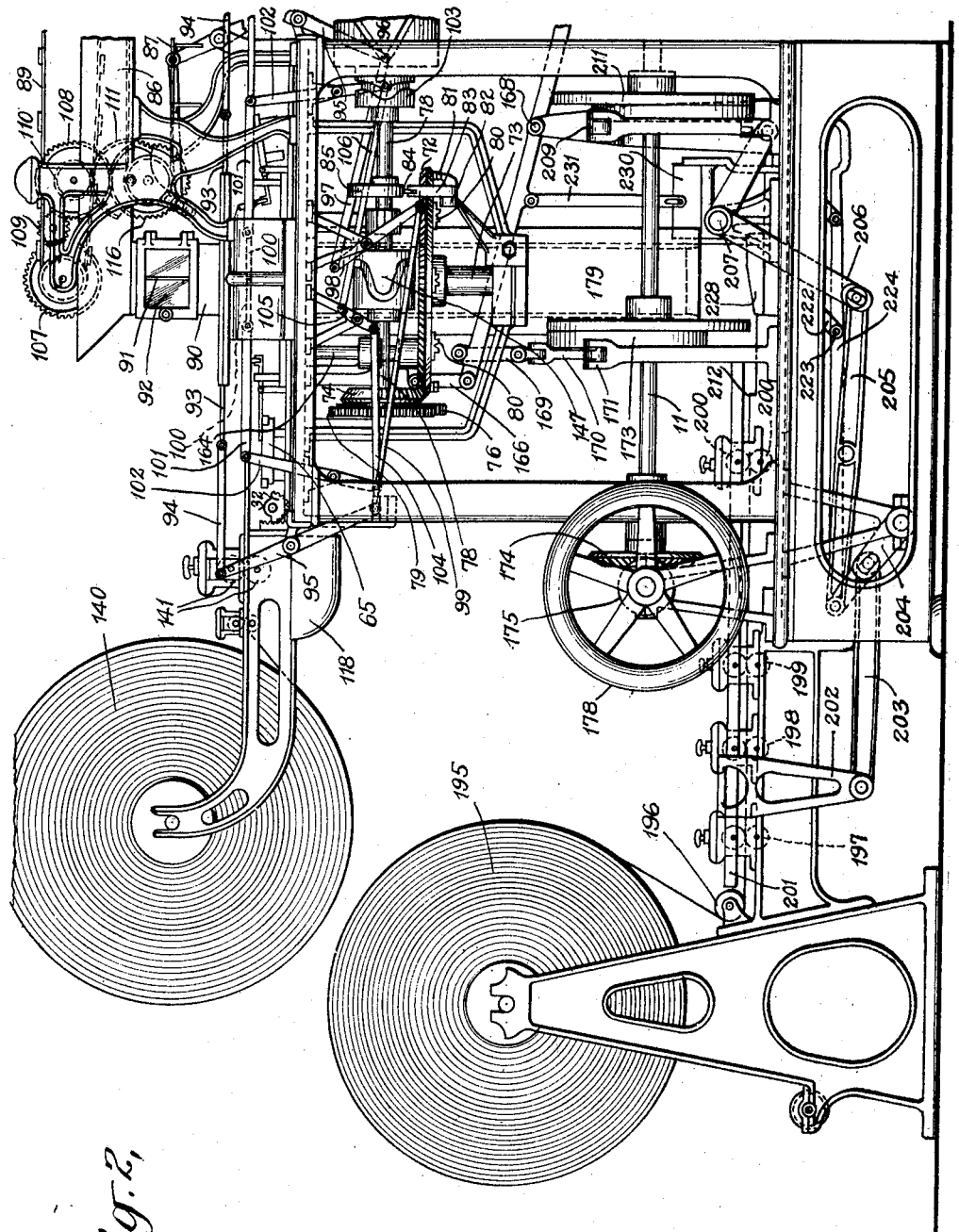

In the drawings Figure 1 is a side elevation of the front end of the apparatus, into which end the box blanks are fed. Fig. 2 is a similar view of the opposite end of the machine. Fig. 3 is a plan view of the front end of the machine. Fig. 4 is a plan of the opposite end of the machine. Fig. 5 is a section taken on the lines V—V of Fig. 4. Fig. 6 is a side elevation of the rear end of the apparatus, looking at the opposite side of the apparatus from that shown in Fig. 2. Fig. 7 is a rear end elevation of the apparatus. Fig. 8 is a detail elevation, showing the mechanism for applying glue or adhesive to the box blanks. Fig. 9 is a plan view of part shown in Fig. 8. Fig. 10 is a section taken on the line X—X of Fig. 9. Fig. 11 is a detailed vertical section of the mechanism for forming the cover blanks about the box. Fig. 12 is a detail transverse section of the mechanism for making the first bend of the cover blanks about the box of matches. Fig. 13 is a similar view showing the mechanism in position with the first bend of the cover blank completed. Fig. 14 is a detail plan view of the mechanism for applying glue or adhesive to the cover blank. Fig. 15 is a section taken on the line XV—XV of Fig. 14. Fig. 16 is a detail plan view of the mechanism for cutting and scoring the box blanks, certain parts being broken away to more clearly illustrate the same. Fig. 17 is a section taken on the line XVII—XVII of Fig. 16. Fig. 18 is a plan view of a portion of box blank strip as cut by the mechanism of Figs. 16 and 17. Fig. 19 it a detail vertical view of the mechanism for cutting the box blanks from the box blank strip. Fig. 20 is a section taken on the line XX—XX of Fig. 19. Fig. 21 is a detail illustrating the pawl and ratchet arrangement of the various feeding devices. Fig. 22 is a detail plan view of the plunger mechanism for forming the box blank and also cutting off and scoring the protective strip to be inserted in the box of matches. Fig. 23 is a section taken on the line XXIII—XXIII of Fig. 22. Fig. 24 is a detail plan view of the mechanism for cutting off and feeding in cover blanks for the boxes. Fig. 25 is a section taken on the line XXV—XXV of Fig. 24. Fig. 26 is a perspective showing one of the box blanks before being formed but after being cut and scored and the box blank strip. Fig. 27 is a similar view illustrating the position of the frame for holding the matches on the box blank. Fig. 28 is a similar view showing also the plunger members for forming the box blank. Fig. 29 is a similar view showing the completed box of matches with the protective strip therein. Fig. 30 is a similar view showing the cover blank partially applied to the box of matches. Fig. 31 is a similar view of the completed box of matches.

A strip of paper or cardboard or other material from which the box blanks are cut is carried in the form of a roll 1. The strip of paper or cardboard is fed over an idler roller 2, and between knurled feeding rollers 3. These feeding rollers feed the box blank material beneath a plunger 4 (Fig. 1), which is operated by means of a link 5 connected to a forked lever 6, in turn operated by a link 7 connected to a lever 8, operated by means of a cam 9 on a cam disk 10 secured to the end of a main power shaft 11. Pivoted to the frame of the machine at 12 are two knives 13, one on each side of the machine (Figs. 1, 3 and 16). Links 14 are connected to the inner ends of these knives, the upper ends of the links being pivotally connected to the plunger 4. Each knife 13 is provided with an extension carrying a guide pin 15, operating in a slot 16 in a member fixed to the main frame. The plunger 4 is moved vertically in a guide frame 17, extending upwardly from the main frame of the machine. There is also pivoted to the frame two lateral knife members 18 (see Figs. 3, 16 and 17), the inner ends of which are pivoted to the lower end of links 19, which, in turn, are pivoted to the plunger 4 at 20, 20, so that upon the vertical movement of the plunger, knife members 18 are operated, together with the knives 13 to cut the carboard blank. The knife members 18 are each provided with a double knife $18^a$ and a double knife $18^b$, the knives $18^a$ being adapted to cut slots 24 from the box blank material (Fig. 18) and the knives $18^b$ being adapted to cut slots 23 from the box blank material, while knives 13 cut the blank between these slots to form edges 25. The knives 13 cut the edges 25 after the slots 23 and 24 have been cut and the blank moved forward, so that these slots come opposite the knives 13. After being fully cut, as shown in Fig. 18, the strip of blanks move longitudinally over the table 21 in the direction of the arrow (Fig. 16).

After each cutting operation the blank is fed forward by means of the intermittently operated feeding rollers 3. These rollers are operated intermittently by means of a gear 26 on the end of the shaft 27 (Fig. 3) which carries the upper rollers 3. The gear 26 is operated by means of a rack 28 carried by a longitudinal sliding bar 29 which is intermittently operated by means of a rack 30 thereon, operated by a segment 31 (Fig. 1) pivoted to the frame at 32, in turn operated by a link 33, connected to a link 34, reciprocated by a cam 35, on a shaft which is operated by a gear 36 meshing with gear 37 on the main driving shaft. The movement of the sliding bar 29 (Fig. 1) causes the forward movement to the left of the box blank strip, by means of the feed rollers 3. When the bar 29 moves to the left the feed rollers 3 are prevented from withdrawing to the right, the box blanks, by means of a suitable pawl and ratchet mechanism, detail of which is shown in Fig. 21. Referring to Fig. 21, the gear 26 is there shown provided with a pawl 22 pressed against a ratchet $22^a$ by means of a spring $22^b$, so that when the rack moves in the direction of the arrow (Fig. 21), gear 26 is caused to rotate in the direction of the arrow thereon, while if the rack moves in the opposite direction, pawl 22 slips over the ratchet $22^a$ and hence the shaft 27, carrying the feed rollers remains stationary.

After the cutting of the edges 23, 24 and 25, the next forward motion imparted to the box blank strip causes it to pass under a frame 38 (see Fig. 3), which carries suitable scoring rollers 39, which make the scores 40, as shown in Fig. 26. As the blank strip is fed farther forward, it is engaged by feeding rollers 41 (Figs. 3, 19 and 20), operated similarly to the rollers 3 by means of gear 42 engaged by a rack 43 carried by the sliding member 29. Feed rollers 41 feed the blank strip under a knife 44, carried by a pivoted member 45, pivoted to the frame at 46 and operated by means of a link 47 connected to its opposite end, which link 47 (see Fig. 1) is connected to a lever 48 by means of a universal joint 49, the lever 48 being operated from the lever 6 so that when the knife members 13 and 18 are cutting the edges 23, 24, 25 of one blank, the knife 44 is severing the strip into separate box blanks, by cutting along the edge 50 (see Fig. 26). The pivoted member 45, which carries the knife 44, also carries two sets of scoring blades $45^a$ and $45^b$ (Fig. 20), which blades act to score the blank along lines extending between the slots 23 thereof.

When the blank is cut off from the blank strip by the knife 44, projections 51 connected to a cross arm 52 by means of horizontal strips 55, which arm 52 is rigidly connected with the sliding bar 29, the projections 51 engage behind the edges 53 (see Fig. 26) on the box blank and upon this movement to the left (see Fig. 3) move the blank forward until the edge 50 thereof drops down to the left of steps 57 on longitudinal bars 56, rigidly connected with the frame. Upon the return movement to the right of the sliding bar 29, the longitudinal members 55, with projections 54, are withdrawn to the right and the blank and upon further movements thereof to the left the blanks are engaged by the projections 54 and moved farther forward, the steps 57 preventing the blank from being retracted to the right. (Fig. 3). This movement of the bar 29 and member 52 to the right brings the second set of projections 58 on the members 55 behind the blank, so that when the bar 29 and member 52 are again reciprocated to the left, the projections 58 engage behind the blank and give it another forward movement to the left. This step by step movement of the cut off blank is continued until the blank is deposited upon a rotary table 59 (see Fig. 4). This table is provided with eight blank receiving portions or stations, each being provided with upwardly extending side flanges 60 and horizontal seat portions 61, the two front seat portions being connected by a still lower cross member $62^1$. As shown in Fig. 4, the blank just received from the feeding means 54, 55, 58, is shown at 62, resting upon the seat portions 61, the edges 63 (see Fig. 26) of the blank lying parallel with and closely adjacent to the upwardly extending flanges 60. The rotary table 59 is mounted to rotate about a vertical axis 64. Each of the eight stations on the rotary table above described is bottomless. That is, there is only provided the ledges 61 upon which the blank is held at its corners. Directly above the center of each of these stations is a rectangular frame 65 pivotally mounted on a horizontal axis upon the rotating table at 66. The rectangular frame 65 is shown in detail in Fig. 27 and is provided with inwardly and downwardly extending feet 67 which are adapted to rest upon the base of the box blank at the four corners thereof, as indicated in Fig. 27. Each of the pivoted rectangular members 65 is provided with an inwardly extending arm 68 (see also Fig. 5) carrying a roller 69, adapted to engage the underneath side of a cam 70 (see Figs. 4 and 6). Cam 70 is rigidly secured to a crosshead 71 on the main frame. It will be noted that as the table 59 is rotated, that whenever a station on it comes opposite the cam 70, its roller on its arm 68 will engage the cam 70, causing the arm 68 to be depressed and the rectangular member 65 to be raised, thereby permitting the feeding devices 55, 58 to feed the box blanks therebeneath. The table 59 with the box blank 62 thereon is then given a rotation one-eighth of its circumference by means of a beveled gear 72 on the shaft 73, having its axis coincident with the axis 64 (see Fig. 5). The beveled gear 72 is given a one eighth revolution periodically by means of a mutilated gear 74 on shaft 75 (see also Fig. 2), which shaft carries a gear 76 meshing with gear 77 on shaft 78 (see Fig. 7). Shaft 78 carries a gear 79 meshing with the gear 36, which is driven from the main shaft, as before described.

In order to prevent the rotary table from moving while the mutilated portion of the gear 74 is opposite the teeth of the gear 72, gear 72 is provided with locking members 80 on its underneath side (see Figs. 2 and 5), which locking members are provided with V-shaped cuts adapted to be engaged by a latch 81, pivoted at 82, and having an arm 83 carrying a roller 84 adapted to be forced downwardly by a cam 85, to force the latch 83 upwardly into engagement with V-shaped cuts in the members 80, to prevent movement of the gear 72, and consequently, to prevent movement of the rotary table 59. The cam 85 is carried on the shaft 78 so that it acts to lock the rotary table each time after the same is given a one-eighth revolution. The shaft 73 carries a friction disk 80ª (Fig. 5) adapted to engage a friction disk 80ᵇ rigid with the frame. These friction disks prevent overthrow of the rotary table after the mutilated portion of the gear 74 comes opposite the teeth of the gear 72.

The first movement of the rotary table after the blank 62 has been deposited in one of the stations thereon brings it to the position A in Fig. 4. The next movement of the rotary table brings it to the next position, and the matches deposited upon the blank.

For the purpose of depositing the matches on the blank a hopper is provided at 86 (Fig. 1) through which runs a belt 87 provided with upwardly extending partition members 88. The matches are deposited within the hopper and properly alined by the partition members 88. A weighted belt 89 runs through the hopper for the purpose of leveling off the matches. The belt 87 (see Fig. 2) deposits the matches in a chute 90 provided with a central partition 91 in order to more efficiently deposit the matches in a pile at the bottom of the chute in uniform position. If desired, glass doors 92 may be provided on both sides of the chute for inspection and easy access thereto (see also Fig. 5). At the base of the chute there are provided two horizontal sliding knives 93, operated by means of links 94, operated by levers 95, which are in turn operated by cam disk 96, one of the levers 95 being connected with the cam disk 96 by means of link 97, lever 98 and link 99. At the base of the chute are provided two horizontal sliding bottom members 100 operated by links 101 connected with levers 102 operated by a cam 103, the left hand lever 102 being connected with cam 103 by means of link 104, lever 105 and link 106. The cams 96 and 103 are carried upon the shaft 78 and at the proper time operate to separate horizontally the bottom members 100, and thereby deposit all of these matches below the closed knife members 93 within the rectangular member 65 directly therebeneath (see Fig. 5). The space between the bottom members 100 and knives 93 is substantially the same as that of one of the completed boxes, so that the charge of matches is just enough to go into one box. After the charge of matches is deposited within the rectangular member 65, the bottom members 100 are again brought together, knife members 93 separated, in order to deposit a fresh charge of matches upon the bottom members 100, for the next box blank to go therebeneath.

For the purpose of driving the belt 89, one pulley over which the belt runs is provided with a gear 107 (see Figs. 2 and 6), which gear is driven by gear 108 through intermediate gear 109 (Fig. 2). Gear 108 has on the same shaft with it a smaller gear 110 adapted to be intermittently driven by means of a segment 111 operated by a link 112 connected to a lever 113, which is connected to another lever 114 by link 115, the link 114 being rocked by means of a cam 96. Between the gears 110 and 108, a pawl and ratchet arrangement is provided (not shown) so that when the gear 110 is moved in one direction by the segment 111 it causes movement of the gear 108, but when the gear 110 is moved in the opposite direction by segment 111, it does not cause movement of the gear 108. In this way the belt 89 is intermittently driven. The gear 108 also drives a gear 116 which carries a drum over which the belt 87 passes, so that the belt 87 is similarly intermittently driven.

Upon a charge of matches being deposited in the rectangular frame 65 and upon the bottom of the box blank 62, the table 59 is given another one-eighth revolution and the matches and the blank are brought into the position marked B in Fig. 4. The next rotation of the table 59 brings the matches and blank to the position marked C in Fig. 4. Here the box blank adjacent the edges 63 is given an application of glue or suitable adhesive, as indicated at 117, Fig. 26. The details of this glue or adhesive applying mechanism are more clearly shown in Figs. 8, 9, 10. A glue pot is there shown at 118 into which glue fingers 119, secured upon the shafts 120, are adapted to dip. The shafts 120 are connected by links 121, 122, 123 and an arm 124 is connected to one of the shafts 120 by means of a link 125 with a lever 126, operated by cam 127, so that fingers 119 are alternately dipped into the glue and glue pot 118 and then brought up to horizontal position, where the glue carried by the fingers 119 is deposited upon glue fingers 128 respectively, carried upon hollow sleeves 129, which sleeves are carried upon shafts 130 rigidly secured to a shaft 131 at right angles to the shaft 130. Shaft 131 carries a segment 132 adapted to be operated by a rack 133 carried by a slide 134 operated by a link 135 connected to a lever 136, the other end of which lever is connected by means of a link 137 to the lever 126. Thus, as the slide 134 is moved upwardly, it rotates the shaft 131, 180°. This carries the shafts 130 from the position shown in Fig. 9 to the position shown in dotted lines in Fig. 10. As the shafts 130 are swung through this arc of 180°, segments 138 on the sleeves 129 engage fixed racks 139, causing sleeves 129 to be given a movement of 180° about the shafts 130 as axes. Thus, whether the fingers 128 are in the position shown in full lines or dotted lines in Fig. 10, they always point downwardly. That is, when swung to the position shown in dotted lines in Fig. 10, glue, which has been deposited on their ends will be properly deposited upon the box blank 62, as shown in Fig. 9. The cam 127 is secured to the shaft 75. If desired, any suitable means may be provided for heating the glue pot 118. After the glue or other adhesive is applied to the blank at position C, the table is given a further one-eighth revolution and the matches brought to the position marked D in Fig. 4. The table is then given a further one-eighth revolution and the matches on the blank are brought to the next position, where the forming of the blank about the matches is to take place. At this position protective strips, adapted to lie on top of the matches in the box, are fed in. These protective strips are fed from a roll shown in Fig. 2 at 140. Suitable feeding rollers 141 feed this strip in, these feeding rollers being carried on shafts which have intermeshing gears 142 (see Fig. 4), one of which gears is operated by a rack 143, operated by bell crank lever 144 connected by link 145 to a bell crank 146, operated by cam 147 (see Figs. 2, 4 and 7). In case it is not desired to feed the protective strips into the boxes a disconnecting clutch 148 is provided between portions of the bell crank 145, which clutch may be operated by a clutch lever 149 (see Fig. 7). The strip fed in from the roll 140 has portions of it cut off by means of a knife 150, pivoted at 151, normally held in an upward retracted position by spring 152 (see Figs. 7, 22 and 23). Knife 150 is operated by a vertical reciprocating member 153, which, when it descends, engages a cam member 153$^a$ pivoted at 153$^b$ and having a cam surface 153$^c$ adapted to engage a projection 153$^d$ on the knife member 150 and forces the same downwardly to cut off the piece of the strip fed in by the roll 140. At the same time a member 154 descends with the member 153 and engages a member 155 pivoted at 156 which carries blades 156$^a$ adapted to score the protective strip at the proper places. The member 153 is adapted to operate the cam member 153$^a$ and cause the knife 150 to cut off the protective strip before the scoring blades 156$^a$ are caused to descend by the member 154 to score the succeeding protective strip.

The protective strip cut off by the knife 150 is fed beneath a plunger 157 (Figs. 5 and 6) carried by rods 158 sliding loosely through a head 159 and connected together at their upper ends by a cross piece 160 (see also Figs. 22 and 23). Attached to the head 159 are side members 161. A vertically reciprocating arm 162 engages the top of the head 159 and is adapted to force the same downwardly together with its side members 161 for the purpose of folding the ends of the protective strip cut off from the roll 140 down about the ends of the bunch of matches on the box blank. This operation will more clearly appear from the consideration of Fig. 28, in which the members 161 are shown in their descended position within the frame 65, between the feet 67 thereof and the sides of the frame. Side members 161 are adapted to slide in guide members 162ª rigid with the cross head 71. When the side plunger members 161 descend springs 163 encircling the rods 158 tend to force the plunger head 157 resiliently against the top of the matches to hold them securely in place.

The arm 162, as well as the members 153 and 154, are carried upon a vertically reciprocating rod 164, operating in guide bearings 165 (see Fig. 6) and having connected to its lower end a link 166, connected to a lever 167, pivoted at 168. Lever 167 is operated by a link 169, having its lower end connected to a lever 170 pivoted at 171, carrying cam roller 172 (see also Fig. 7), operated by cam 173 on the main drive shaft 11, which drive shaft is provided with a beveled gear 174 operated by beveled gear 175 on shaft 176, carrying suitable belt pulleys 177. At the other end of the shaft 176 is provided a hand wheel 178 (see Figs. 2, 6 and 7).

The descent of the plunger members 161 first bends the ends of the protective strip cut off from the roll 140 about the ends of the bunch of matches, as above explained. Further descent of the plunger members 161 causes the box blank with the matches and protective strip thereon to be forced down a forming chute 179 (see Fig. 5). At the top of the chute 179 there is provided pivoted folding members 180, which, as the box blank with the matches thereon is forced down the chute, causes the sides 181 (Fig. 28) of the box blank to be folded up vertically to form the sides of the box. Pivotally connected to the members 180, at their outer ends, are end folding members 182 having cam rollers 183 engaging cams 184, which, after the sides 181 have been substantially folded to vertical position, are caused to move inwardly and force the side ends 184 of the box blank into positions parallel with the ends of the box. As the box blank, with the matches thereon, is forced downwardly farther by the side members 161, the ends 185 of the box blank engage the edges 186 of the forming chute 179 (Fig. 5), which causes the ends 185 (Fig. 28) to be bent upwardly, the glued portion 163 coming in contact with the side end portions 184 already bent in, and further movement of the box blank with the matches therein down the chute causes the ends 185 to be pressed against and adhesively secured to the side end members 184.

After this operation takes place, the boxed matches being in the shape shown in Fig. 29, the next movement of the lever 167 (Fig. 6) causes fingers 187, pivoted at 188 to a cross head 189 to be forced inwardly to engage over the top of the box of matches and pull the same downwardly through the chute 179. The pivoted fingers 187 are provided with short arms on each side of the chute 179, having links connected thereto, which are in turn connected with cross heads 190 (Fig. 6) on each side of the chute 179, which cross heads 190 are connected to the lever 167 by links 191, which lever 167 is bifurcated, having a portion passing on each side of the chute 179. The first operation of the downward movement of the lever 167 causes a downward movement of the crossheads 190 with respect to the crossheads 189, causing the fingers 187 to revolve about their pivots and engage over the top of the box of matches. For this purpose the sides of the forming chute 179 are slotted, as at 192 (Fig. 5). Further downward movement of the lever 167 causes the crossheads 189 to be pulled downwardly, they being provided with suitable guide slots 193. This causes the fingers 187 to be pulled downwardly and at each reciprocatory movement thereof to push the box of matches down the chute a distance equal to the height of one of the boxes. In this way the lower end of the chute is filled with boxes of matches with protective strips on the top of the same, and they are ejected from the lower end of the chute 179, as further boxes are formed therein. Spring locking fingers 194 (Fig. 6) are shown adapted to engage notches in the end of crosshead 189, so as to hold it in the desired positions at the end of its downward movement and at the end of its upward movement.

Referring to Fig. 2,—195 represents a roll of paper or cardboard from which the cover of the box is to be formed. This strip of cover blank material is fed beneath an idler 196, through feeding rollers 197. The rollers 198 and 199, through which the strip passes, indicate printing rollers, by which any desired matter may be printed on the cover. The strip then passes between rollers 200. The feeding rollers 197 and 200 are intermittently operated, by means of a rack gear, pawl and ratchet arrangement, similar to the means for driving the feed rollers 3, described in connection with Fig. 1. For this purpose the rack may be carried by longitudinal sliding member 201 (Fig. 2) having connected thereto a depending arm 202, operated by link 203, connected to a lever 204, which lever is connected by a link 205 operated by a bell crank 206, pivoted at 207, and connected by a link 208 (Fig. 7) with a lever 209, carrying a cam roller 210 operated by a cam disk 211 secured to the main drive shaft 11. The sliding member 201 carries a transverse frame 201ª (Figs. 24, 25) to the underneath side of which are journaled four scoring rollers 201ᵇ coöp- erating with grooves 201ᶜ in the bed plate of the machine. As the cover blank material is fed forward by feeding rollers 200, the scoring rollers 201ᵇ go forward therewith and on return of the sliding member 201 scoring rollers 201ᵇ are carried backwardly and coöperate with the grooves 201ᶜ to score the cover blank on the lines along which it is to be later folded.

After being scored and passing from the feeding rollers 200, the cover blanks are cut from this strip of cover blank material at point 212 (Fig. 2). For this purpose a knife 213 (Figs. 7, 24, 25) pivoted at 214, is forced downwardly to cut off the cover blanks by means of a depending arm 215 secured to the lever 170 (Fig. 7). The member 215 engages the end of the knife 213, opposite pivot 214. The knife is normally held upwardly with its right hand end against member 215, by means of a spring 216, having one end connected to the right hand end of the knife 213 and its other end connected to a projection carried by the depending arm 215. The right hand end of the knife 213 is provided with a guide pin, operating in a guide slot 217, in a bracket 218, fixed to the frame.

A cover blank being cut off, then, upon the next forward movement of the sliding member 201, pushers 260 carried by a cross member 261 (Figs. 24 and 25) secured to the sliding member 201, engage the back edge of the cover blank and cause it to be pushed forward over the fixed horizontal strip 262, having steps 263 to prevent the blank from sliding or being drawn backwardly upon the return movement of the pushers 260. The next reciprocation of the cross member 261 causes pushers 264 carried thereby to engage the cover blank and cause it to be pushed forward and deposited beneath the chute 179 (Fig. 6), where, as each cover blank is thus deposited, one of the filled boxes of matches is deposited from the chute upon the cover blank. It is thereupon engaged by a pusher member 219, pivoted at 220, to a sliding member 221 (Fig. 11). Pivoted to the member 221 is a bell crank 222, having its lower arm pivoted at 223 to operating bar 224. The upper end of the bell crank 222 is forked, as shown at 225. The operating bar 224 is pivotally connected to the link 205 so as to be given a reciprocatory movement from the driving shaft 11, as above explained. On being pulled to the right (Fig. 11) the bar 224 rocks the bell crank 222, causing the forked end 225 to be lowered and thus permitting the pivot member 219 to rotate anti-clockwise about its pivot, and so drop below the surface 226, upon which the cover blanks rest. Upon being forced to the right (Fig. 11), the bar 224 rocks the bell crank 222 in the opposite direction, causing its arm 225 to be raised, which throws up the pivoted member 219 at the left hand end of the box blank with the box of matches thereon, so that it will engage the end of the box of matches. For this purpose the table or surface upon which the blanks and the boxes of matches rest is slotted, the member 219 being projected up through the slot. Further movement of the reciprocating bar 224 to the right (Fig. 11) causes the sliding member 221 to be forced to the right, carrying with it bell crank 222 and the pivot member 219 in its upright position, which carries the box blank with the box of matches thereon. As the tier of boxes in the forming chute 179 is forced downwardly onto the cover blank therebeneath, a fixed member 228 (Figs. 2, 12, 24, 25) engages the longer projecting end of the cover blank and causes it to be lifted slightly with respect to the bottom of the cover blank. That is, the cover blank 229 is bent as shown in Fig. 12. The pusher 219 pushes the cover blank with the box of matches thereon beneath the plunger 230 (Fig. 12) operated by a link 231 connected to the lever 167 previously described, so that upon the link 231 being forced downwardly, the plunger 230 forces the box of matches with the cover blank therebeneath between the two folding members 232. This folds one short side of the cover blank as well as the other long cover side up vertically about the box of matches, as shown in Fig. 13. The next reciprocation of the pushing device by means of reciprocating bar 224 causes the pusher 233 (Fig. 11) operated in a manner similar to the pusher 219, to engage behind the blank and box of matches, and push it into a forming chute having a folding flange 234, which acts to fold the top of the cover blank over the box of matches. Further reciprocation of the bar 224 causes another pusher member 235, operated in a manner similar to the pusher members 219 and 233, to force the cover with the box of matches farther through the cover forming chute 227. This movement of the cover blank and the box of matches causes the edge of the unfolded side 236 of the cover blank to pass horizontally between a spring finger 237 and a glue applying roller 238 (see also Figs. 14, 15, 3 and 6). Roller 238 applies glue or other suitable adhesive to the edge of the cover blank 239, as shown in Fig. 30. The glue or other adhesive is applied to the roller 238 by means of a spoon 240, pivoted on shaft 241 and operated by a crank arm 242 and hollow link 243, connected to a rod link 244 within the link 243, by means of set screw 245 (Fig. 6). The rod 244 is pivotally connected to the lever 167, to be operated thereby. Thus the lever 167 operating the link members 244, 243, causes the spoon 240 to rock downwardly and dip into the glue pot 246, and carry a portion of the glue or adhesive upwardly to the glue applying roller 238. The glue applying roller 238 is carried by an arm 247, loosely mounted upon the shaft 241. When the spoon dips into the glue pot 246, roller 238 carried by the arm 247 drops downwardly until the arm 247 strikes the edge of the side of the glue pot 246. The spoon, however, continues its downward movement and dips into the glue, and upon its return upward movement, carries a portion of the glue to the roller 238, and at the end of its upward movement raises the roller 238 by means of a projection 248, carried by the spoon, which engages underneath the arm 247 and raises the same, so that the roller 238 is brought into engagement with the cover blanks, the cover blanks are held in contact with the roller 238 by means of the spring finger 237, which is so adjusted as to remain out of contact with the roller 238 when there is no cover blank between the spring finger and the roller.

In case the glue, after gluing one of the cover blanks, should cause the roller 238 to adhere to the spring 237 and thus tend to prevent the next oncoming cover blank from passing between the same, the arm on which the spoon 240 is carried is provided with a toe 270, which, when the link 243 is pulled upwardly to its extreme position, engages the top of the arm 247, carrying the glue applying roller 238, and causes the said arm to be knocked downwardly, thus loosening the glue applying roller 238 from the spring 237. The glue applying roller 238 is fixed to a shaft 271, which has secured to its other end a gear or knurled head 272 (Fig. 14) which may be driven continuously or intermittently from any suitable source to drive the glue applying roller 238, if so desired.

After the adhesive is applied to the edge of the side of the cover at 239, as thus explained, a further pusher 249 (Fig. 11) engages the cover blank with the box of matches thereon and forces it farther through the chute 227, causing it to engage with a further cam face 250, which bends the side 236 (Fig. 30) of the cover downwardly to a vertical position, so that the adhesive 239 engages a short bent-up side of the cover 251 (Fig. 30) and the same is adhesively attached thereto by the adhesive applied at 239, so that the cover is completely formed about the box, as shown in Fig. 31.

As covers are applied on further boxes, which are pushed through the forming chute 237 by the pusher 249, the completed boxes of matches with the covers thereabout are ejected from the chute 227 into any suitable receptacle.

What I claim as new and desire to secure by Letters Patent is:

1. A machine of the class described having in combination, means for feeding box blanks, means for feeding matches to the box blanks, means for feeding a protective strip to the top of the matches fed to each box blank, means for folding the box blanks about the matches and means for applying a removable cover to each box of matches.

2. A machine of the class described having in combination, means for feeding box blanks, means for feeding matches to the box blanks, means for feeding a protective strip to the top of the matches fed to each box blank, means for folding the box blanks about the matches and folding the ends of the protective strip down about the sides of each batch of matches and means for applying a removable cover to each box of matches.

3. A machine of the class described having in combination, means for feeding box blanks, means for feeding matches to the box blanks, means for feeding a protective strip to the top of the matches fed to each box blank and means for folding the box blanks about the matches and folding the ends of the protective strip down about the sides of each batch of matches.

4. A machine of the class described having in combination a moving table, means for feeding box blanks thereto, means for feeding batches of matches to the box blanks, a bottomless holder holding the matches in position on the blanks, means for feeding a protective strip to the top of each batch of matches and means forming the box blanks about the batches of matches.

5. A machine of the class described having in combination, a moving table, means for feeding box blanks thereto at one point, means for applying adhesive to the upper side of the blanks while on the table at another point, means for feeding matches to the blanks on the table at another point and means for forming the box blanks about the matches deposited thereon at another point.

6. A machine of the class described having in combination, a moving table, means for feeding box blanks thereto at one point, means for applying adhesive to the blanks while on the table at another point, means for feeding matches to the blanks on the table at another point and means for forming the box blanks about the matches deposited thereon at another point, said adhesive applying means comprising an adhesive container, oscillating arms for applying the adhesive to the blanks and means periodically dipping into the adhesive container for transferring adhesive therefrom to said oscillating arms.

7. A machine of the class described, having in combination, means for feeding box blanks, means for applying adhesive to the blanks, said adhesive applying means comprising an adhesive container, oscillating arms for applying the adhesive to the blanks and means periodically dipping into the adhesive container for transferring adhesive therefrom to said oscillating arms.

8. In a machine of the class described, having in combination, means for feeding box blanks, means for cutting said blanks comprising a reciprocating plunger and pivoted knives operated thereby, means for scoring said blanks and means for folding said blanks into boxes.

9. In a machine of the class described, having in combination, means for feeding box blanks, means for cutting said blanks comprising a reciprocating plunger and pivoted knives operated thereby, means for scoring said blanks and means for applying adhesive to said blanks, means for depositing matches, or the like, upon said blanks and means for folding the blanks about the matches to box the matches.

10. A machine of the class described, having in combination, means feeding a strip of box blank material, means cutting the sides of said strip to form the ends of the boxes to be formed therefrom, means for scoring said blanks, means cutting the strip into separate blanks, means for applying adhesive on to the upper side of certain parts of said blanks, and means forming the separate blanks into boxes.

11. A machine of the class described, havin combination, means for feeding box blanks, means for feeding matches to the box blanks, means for feeding a protective strip to the top of the matches fed to each box blank, means for cutting off and scoring said protective strip, and means for folding the box blanks about the matches.

12. A machine of the class described, having in combination, means for feeding box blanks, means for feeding matches to the box blanks, means for feeding a protective strip to the top of the matches fed to each box blank, means for cutting off and scoring said protective strip, means for folding the box blanks about the matches and folding the ends of the protective strip down about the sides of each batch of matches and means for applying a removable cover to each box of matches.

13. A machine of the class described, having in combination, a rotatable table, means feeding box blanks thereto, means feeding matches to said blanks, a bottomless holder for holding the matches in position on each blank, a forming chute, means forcing the blanks and matches into said chute to form the blanks into boxes with the matches therein and means engaging a previously formed box of matches and forcing it along said chute ahead of the box being formed.

14. A machine of the class described, having in combination, means feeding box blanks, means feeding matches to said blanks, a forming chute, means forcing the blanks and matches into said chute to form the blanks into boxes with the matches therein and means engaging a previously formed box of matches and forcing it along said chute ahead of the box being formed.

15. A machine of the class described, having in combination, means feeding box blanks, means feeding matches to said blanks, a forming chute, means forcing the blanks and matches into said chute to form the blanks into boxes with the matches therein, means engaging the boxes of matches and forcing them out of said chute, said means comprising a reciprocating head, arms pivoted to said head for engaging the boxes of matches and means acting first to rock said arms about their pivots whereby they may engage the boxes of matches and then causing said arms to move longitudinally of the chute to force the boxes of matches along the chute.

16. A machine of the class described, having in combination, means for forming box blanks into boxes containing the matches, means for feeding cover blanks beneath the boxes of matches, a reciprocating plunger and coöperating forming members for folding the sides of the cover blanks about the boxes of matches, a forming chute and means forcing the covers and boxes through said chute to completely form the cover blanks about the boxes, said last-mentioned means comprising a sliding member, dogs pivoted thereto for pushing the boxes through the chute, cam levers pivoted to the sliding member for throwing the dogs into position to engage the boxes during one movement thereof and permitting the dogs to move to another position during the reverse movement of the sliding member whereby they will pass beneath the boxes during such reverse movement.

17. A machine of the class described, having in combination, means for forming box blanks into boxes containing the matches, means for feeding cover blanks beneath the boxes of matches, a forming chute and means forcing the covers and boxes through said chute to form the cover blanks about the boxes, said last-mentioned means comprising a sliding member, dogs pivoted thereto for pushing the boxes through the chute, cam-levers pivoted to the sliding member for throwing the dogs into position to engage the boxes during one movement thereof and permitting the dogs to move to another position during the reverse movement of the sliding member whereby they will pass beneath the boxes during such reverse movement.

18. A machine of the class described, having in combination, means for forming box blanks into boxes containing the matches, means for feeding cover blanks beneath the boxes of matches, a reciprocating plunger and coöperating forming members for folding the sides of the cover blanks about the boxes of matches, a forming chute, means for applying adhesive to said cover blanks, said adhesive applying means comprising a reciprocating adhesive applying roller, means forcing the cover blanks into engagement with said roller, an adhesive receptacle and a reciprocating carrier for transferring adhesive from the receptacle to the roller.

19. A machine of the class described, having in combination, means for boxing matches, means folding cover blanks about the boxes of matches and means for applying an adhesive to the cover blanks, said adhesive applying means comprising an adhesive applying roller, means forcing the cover blanks into engagement with said roller, an adhesive receptacle and a reciprocating carrier for transferring adhesive from the receptacle to the roller.

20. A machine of the class described, having in combination, means for boxing matches, means folding cover blanks about the boxes of matches and means for applying an adhesive to the cover blanks, said adhesive applying means comprising an adhesive applying roller, a pivoted arm carrying said roller, an adhesive receptacle and oscillating means for transferring adhesive to the roller.

21. A machine of the class described, having in combination, means for boxing matches, means folding cover blanks about the boxes of matches and means for applying an adhesive to the cover blanks, said adhesive applying means comprising an adhesive applying roller, a pivoted arm carrying said roller, an adhesive receptacle, means for transferring adhesive to the roller and means whereby said transferring means moves the pivoted arm carrying the roller to bring it into operative position to apply adhesive to the covers.

22. A machine of the class described, having in combination, a hopper for the matches, means separating the matches in the hopper into groups, means for boxing each group of matches and means feeding the matches to the hopper comprising a traveling belt and a weighted belt traveling on top of the matches on said traveling belt.

23. A machine of the class described, having in combination, a forming chute, means feeding the blanks to said chute, means feeding a batch of matches to each blank, a reciprocating plunger having side blades for forcing the blanks with the matches thereon into said chute to form the blanks into boxes about the matches and a spring-pressed device carried by said plunger and acting to press against the matches at the top of the box as the plunger forces the blank and matches into the chute.

In testimony whereof, I have signed my name to this specification.

CHARLES W. VAN VLEET.